United States Patent [19]

Mansfield

[11] 4,109,590

[45] Aug. 29, 1978

[54] APPARATUS AND METHOD FOR PRODUCING GAS

[75] Inventor: Vaughn Mansfield, Gallatin, Tenn.

[73] Assignee: Mansfield Carbon Products, Inc., Gallatin, Tenn.

[21] Appl. No.: 747,194

[22] Filed: Dec. 3, 1976

[51] Int. Cl.² .................. F23G 5/00; F23L 9/00; F23J 1/02
[52] U.S. Cl. .................. 110/235; 110/244; 110/254; 110/270; 110/165 R
[58] Field of Search .......... 201/27, 32; 110/8 R, 110/8 B, 40, 15, 116, 118, 165, 72 R, 75

[56] References Cited

U.S. PATENT DOCUMENTS

| 1,598,390 | 8/1926 | Piernay | 110/8 B |
| 2,005,812 | 6/1935 | Thomas | 110/15 X |

FOREIGN PATENT DOCUMENTS

| 702,430 | 4/1931 | France | 110/8 B |
| 162,597 | 5/1921 | United Kingdom | 110/8 B |

*Primary Examiner*—Kenneth W. Sprague

[57] ABSTRACT

Continuously flowing solid material, such as municipal waste, is pretreated in an air-starved hot moving grate carbonizer furnace to drive off low temperature volatiles, and then further devolatized in a shaft furnace wherein limited amounts of air are let into a downwardly moving stack of the precarbonized material at a plurality of locations spaced sufficiently apart as to preclude formation of hot spots, i.e., localized regions of intense reaction, such as would cause clinkers to be formed. Low Btu gas is exhausted from the pretreatment carbonizer and shaft furnace and sterile ash residue is discharged from the bottom of the shaft furnace.

5 Claims, 2 Drawing Figures

APPARATUS AND METHOD FOR PRODUCING GAS

RELATED APPLICATION

Mansfield METHOD AND APPARATUS FOR PRODUCING GAS FROM SOLID MUNICIPAL WASTE, filed concurrently herewith.

PRIOR ART

"Purox" and "Andco-Torrax" systems, Mansfield U.S. Pat. No. 3,434,932; Kay U.S. Pat. No. 1,913,396; Wagner U.S. Pat. No. 3,126,846; and Kato et al. U.S. Pat. No. 3,863,578.

OBJECTS

Economical and ecological disposal of solid municipal waste material has been the objective of many systems. It has been recognized that this material averages about 5,000 Btu per pound. Some such systems (Andco-Torrax) use blast-furnace techniques, and some others (Purox) use oxygen instead of air. By and large, they are characterized by high capital cost and low conversion efficiency, and some are subject to "hang-up" and clinker formation.

According to this invention, solid municipal waste is continuously introduced via air locks into a hot moving grate carbonizer furnace, i.e., a furnace through which a thick bed of the material progresses on an endless chain grate, wherein a limited amount of carbonization takes place in the presence of closely controlled amounts of preheated air. In passing through the carbonizer furnace, all the moisture is first driven off the material and exhausted from the furnace so that it does not enter into the gaseous atmosphere of the furnace, and then limited burning raises the temperature of the material in the bed to about 1800° F., as averaged from top to bottom, which drives off low temperature volatiles. As the carbonized material drops off the end of the chain grate into the top of a downwardly-moving stack in a downwardly-widening shaft furnace, it is agitated.

A further object of the invention is to provide for the introduction of small amounts of combustion air into the downwardly moving stack of material in the shaft furnace at many different locations so that localized intense burning of the material does not occur. To this end, it is intended now to provide hip-like enlargements of the shaft furnace, with a series of downwardly-facing air ports on the hips, so that air flows into the material along the entire lengths of the hips; and by facing the air ports downwardly, clogging is avoided. Limited amounts of air are fed into the material in the lower portion of the shaft furnace through an incremental feeder, or reciprocating step grate so as to complete the oxidation of the material and reduce it to sterile ash. A water jacket cools the walls of the shaft furnace and pre-heats water for a boiler in which low Btu gas exhausted from the furnace chambers is burned.

These and other objects will be apparent from the following specification and drawings, in which.

Figures 1, 2:
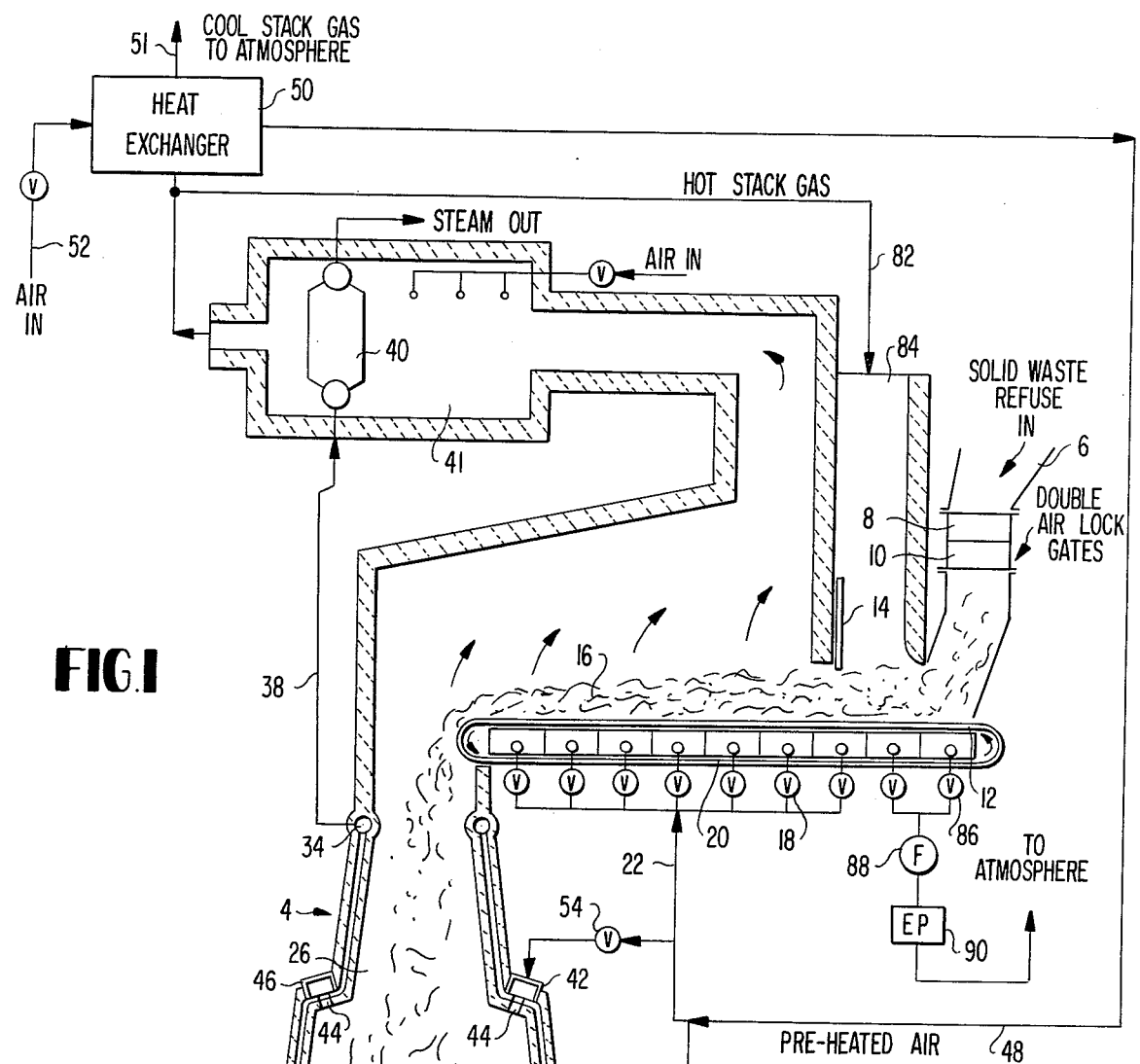
FIG. 1 is a diagrammatic cross section through the furnace and boiler.
FIG. 2 is an enlarged fragmentary detail illustrating the step grate and operating mechanism therefore.

Referring now to the drawings in which like reference numerals denote similar elements, the system is comprised essentially of a horizontal chain grate pretreatment furnace 2 which feeds into a shaft furnace 4, both furnaces being refractory lined. Solid municipal waste is supplied to the pretreatment furnace 2 from a charging hopper 6 and double lock feeding units 8 and 10 which eliminate, to the extent practical, the entrance of air into the pretreatment furnace along with the feed stock. After passing through the double lock feeding units the material digresses onto a chain grate 12 on which it passes under an adjustable gate 14 so as to form a bed 16 about 4 feet thick. Underfire preheated air, controlled by valves 18, is supplied to the zones of an under-grate zoned air box 20 via an input 22. Hot gases are exhausted from the pretreatment furnace through a flue 24. All of the apparatus thus far described is well known. In this example, let it be assumed that the chain grate is approximately 12 feet wide by 15 feet long, the bed formed thereon should be about 4 feet thick, and the grate speed approximately 10 to 15 inches per minute. With a 4 foot bed the system treats approximately 400 tons of solid waste refuse per 24 hours.

The pretreatment furnace 2 is initially heated by building a fire on the grate, and sufficient air is supplied through the undergrate zoned air box 20 to provide limited combustion with the refuse on which the bed is constituted so as to raise the average bed temperature, as the latter drops off the end of the chain grate to approximately 1800° F., the bed having reduced in thickness while in transit through the furnace. By downdrafting hot spent exhaust gases through the material passing over the initial zones of the airbox, all of the moisture will be driven off in the pretreatment furnace so that it does not report into the gas exhausted via the flue. This is important where the starting material has a high moisture content, as does solid municipal waste.

Shaft furnace 4 enlarges downwardly so as to prevent hang-up of the stack 26 of the pretreated material as the latter moves downwardly therethrough. The shaft furnace is approximately the same width as the pretreatment furnace 2, its walls being formed of boiler tubes 28 of about 2½ to 3 inches in diameter connected by webs approximately ¼ inch wide. A silicon carbide lining 30 is applied to the inner sides of the tubes, and the tubes are connected to headers 32 and 34 fed with water from a water input diagrammatically indicated at 36. Header 34 connects the upper ends of the tubes via a line 38 to a boiler 40, the combustion chamber 41 of which is supplied with low Btu gas from flue 24. A novel feature of shaft furnace 4 is that intermediate its upper and lower ends it is formed with outwardly flaring hips 42 at which the webs between the boiler tubes 26 are cut away to provide ports 44. A manifold 46 supplies air to the material through the ports at spaced points all along the hips. The manifold is supplied with preheated air via air line 48 from the heat exchanger 50, which supplies preheated air at about 450° F., fed in by a fan 51 from an air intake 52, to both the manifold 46 and the zones of the air box 20. The portion of the spent gases which are not used for downdrafting to dry the material which enters furnace 2 are exhausted to the atmosphere via a stack 51 after passing through heat exchanger 50, which transfers heat therefrom to the air from inlet 52 used to feed the zones of airboxes 20 and 74 and manifold 46. The air flow to the manifold is controlled by valves 54. Because the ports 44 face downwardly, the material passing by will not clog them.

At the lower end of shaft furnace 4 is a reciprocating step grate 56 which feeds the ash residue laterally to an outlet 58. Inward air flow through the outlet is inhibited by double air lock gates 60, 62. Controlled amounts of air are fed into the material in the lower portion of shaft furnace 4 through passages 64 in the steps 66 which slide upon cross-beams 68 and themselves. Metal bindings 70 on the ceramic steps take the wear, and the steps are oppositely reciprocated by cranks 72 in a well-known manner. Beneath the steps 66 is a zoned airbox 74, the zones of which are supplied with cool air from line 76, which air is individually controlled by valves 78. The air supplied through the steps keep them cool. It also cools the hot ashes at the bottom of the shaft furnace, and it, in turn, becomes pre-heated thereby. Screw conveyors 80 remove ash residue which falls into the airbox zones.

Some of the hot spent gases exhausted from boiler combustion chamber 41 is fed via line 82 to the downdraft flue 84 of the pre-treatment furnace 2, these gases being drawn downwardly through the bed and through control valve 86 by a fan 88 and thence to the atmosphere via an electrostatic precipitator 90.

The foregoing system is designed to generate approximately 120,000 pounds of steam per hour assuming an over-all conversion efficiency of about 73.6% to usable steam or about 92% to a low Btu gas. A boiler efficiency of about 80% is assumed for converting the low Btu gas to steam. The make-up of the low Btu gas is as follows:

| | | |
|---|---|---|
| $CO_2$ | 7.6 | |
| $CO$ | 28.6 | |
| $H_2$ | 11.6 | Estimated 131 Btu/SCF |
| $CH_4$ | 1.8 | |
| $O_2$ | .4 | |
| $N_2$ | 50.0 | |

The reaction temperatures of the material in the shaft furnace are about 1700° F. at the top of the stack, and about 1800° F. in the region of the airports 44. The temperature of the low Btu gas is about 1800° F. The temperature of the water leaving header 34 is about 330° F.

Alternate fuels, such as bagasse, lignite, woodchips, peat, sub-bituminous and bituminous fuels may be used in the apparatus. Where moisture content of the starting material is so low as to present no problem of reporting into the output gas stream, the downdrafting step may be eliminated.

I claim:

1. In combination,
    a horizontal chain grate furnace having
        input and output ends,
        means for feeding solid municipal refuse onto the chain grate at the input end,
        means for spreading said material onto said chain grate to form a bed thereon,
        zoned airbox means beneath the grate for supplying air in controlled amounts to the material in the bed,
    a vertical shaft furnace having an upper end connected to the output end of the horizontal furnace and a lower end,
    an incremental feeder for discharging sterile ash residue from the lower end of the shaft furnace,
    means for supplying controlled amounts of air into the shaft furnace at a plurality of spaced locations between the upper and lower ends thereof, and
    means for exhausting gases from said furnaces.

2. The combination claimed in claim 1, said vertical shaft furnace having side walls which diverge laterally outwardly intermediate upper and lower ends thereof to provide hip-like enlargements having downwardly-facing surfaces on their inner sides, said first means for supplying air into said shaft furnace at a plurality of spaced points including a plurality of ports through said downwardly-facing surfaces, which ports are distributed along the lengths of said enlargements.

3. The combination claimed in claim 2, and means for supplying preheated air to said ports.

4. The combination defined in claim 1, and additional means for supplying controlled amounts of air into the lower end of the shaft furnace.

5. The method of producing heat and gas from solid municipal waste material which comprises,
    preheating said waste by continuously feeding a bed thereof through a hot horizontally-moving grate furnace while feeding limited amounts of hot air upwardly through the bed in sufficient quantities to effect limited carbonization and devolatization of said material in the bed, reacting the pretreated material by collecting the same from off the end of the horizontally-moving grate and forming a downwardly-moving stack therewith in a vertical shaft furnace by continuously dropping the same off the horizontally-moving grate into said shaft furnace while removing ash residue thereof from the bottom of the furnace and while feeding air into the material in the downwardly moving stack at a plurality of locations intermediate the upper and lower ends of the shaft furnace and at the lower end thereof while limiting the amounts of air so fed sufficiently to cause said material to react and convert to ashes as said material passes through the shaft furnace but insufficient to promote the formation of regions of localized intense burning, exhausting the gaseous by-products of said pretreating and devolatizing steps from said furnace, and passing said exhausted gases to a utilization device.

* * * * *